(12) United States Patent
O'Brien et al.

(10) Patent No.: US 7,630,159 B2
(45) Date of Patent: Dec. 8, 2009

(54) RESISTANCE MODE COMPARATOR FOR DETERMINING HEAD RESISTANCE

(75) Inventors: Scott M. O'Brien, Bloomington, MN (US); Michael P. Straub, Longmont, CO (US); Jeffrey A. Gleason, Burnsville, MN (US); Shubha Bommalingaiahnapallya, Eagan, MN (US); Nameeta Krenz, Carver, MN (US); Arvind Aemireddy, Irving, TX (US)

(73) Assignee: Agere Systems Inc., Allentown, PA (US)

( * ) Notice: Subject to any disclaimer, the term of this patent is extended or adjusted under 35 U.S.C. 154(b) by 454 days.

(21) Appl. No.: 11/140,262

(22) Filed: May 27, 2005

(65) Prior Publication Data

US 2006/0267582 A1 Nov. 30, 2006

(51) Int. Cl.
*G11B 5/03* (2006.01)

(52) U.S. Cl. .................... 360/66; 360/46; 360/67; 360/110; 360/313

(58) Field of Classification Search .................. None
See application file for complete search history.

(56) References Cited

U.S. PATENT DOCUMENTS

| | | | |
|---|---|---|---|
| 4,746,869 A | 5/1988 | Schrag et al. | |
| 4,862,078 A | 8/1989 | Kawabata | |
| 5,087,884 A * | 2/1992 | Brannon | 324/523 |
| 5,309,294 A * | 5/1994 | Cahalan | 360/66 |
| 5,444,579 A * | 8/1995 | Klein et al. | 360/67 |
| 5,515,314 A * | 5/1996 | Kouhei et al. | 365/158 |
| 5,589,777 A | 12/1996 | Davis et al. | |
| 5,696,445 A | 12/1997 | Inbar | |
| 5,790,334 A * | 8/1998 | Cunningham | 360/66 |
| 5,877,911 A * | 3/1999 | Klaassen et al. | 360/67 |
| 5,959,798 A * | 9/1999 | Sasaki et al. | 360/67 |
| 5,978,163 A * | 11/1999 | Cunningham | 360/66 |
| 5,986,839 A * | 11/1999 | Klaassen et al. | 360/66 |
| 6,025,979 A * | 2/2000 | Yamane et al. | 360/324.1 |
| 6,067,200 A * | 5/2000 | Ohba et al. | 360/66 |
| 6,069,761 A | 5/2000 | Stupp | |
| 6,225,802 B1 * | 5/2001 | Ramalho et al. | 324/252 |
| 6,320,713 B1 * | 11/2001 | Tretter et al. | 360/66 |
| 6,349,007 B1 | 2/2002 | Jiang | |
| 6,448,768 B1 * | 9/2002 | Ishibashi et al. | 324/251 |
| 6,487,034 B1 | 11/2002 | Jiang et al. | |
| 6,631,048 B1 * | 10/2003 | Tanaka | 360/77.04 |
| 6,687,064 B1 | 2/2004 | Jiang et al. | |
| 6,731,448 B2 * | 5/2004 | Briskin et al. | 360/66 |
| 6,744,578 B1 * | 6/2004 | Bishop | 360/31 |
| 6,794,880 B2 | 9/2004 | Tucker | |
| 6,822,815 B2 * | 11/2004 | Lim et al. | 360/31 |

(Continued)

OTHER PUBLICATIONS

Wasaki, H., et al; "Current Multiplier/Divider Circuit"; Electronics Letters; Mar. 14, 1991; vol. 27, No. 6; pp. 504-506.

*Primary Examiner*—Hoa T Nguyen
*Assistant Examiner*—Dismery E Mercedes

(57) ABSTRACT

An apparatus and method for determining a resistance of a magneto-resistive head. A current drawn by the head, in response to a fixed bias voltage across the head, is converted to a zero temperature coefficient current such that when supplied to a resistor connected to an input terminal of a comparator the effects of variations in the resistance value are avoided. An output signal of the comparator indicates the resistance of the magneto-resistive head.

24 Claims, 5 Drawing Sheets

U.S. PATENT DOCUMENTS 7,130,143 B1 * 10/2006 Tretter ........................ 360/66
7,152,800 B2 * 12/2006 Ranmuthu et al. .......... 235/492
2005/0046983 A1    3/2005 Fong et al.
2006/0152838 A1 *  7/2006 Fitzgerald et al. ............ 360/46

\* cited by examiner

RESISTANCE MODE COMPARATOR FOR DETERMINING HEAD RESISTANCE

FIELD OF THE INVENTION

The present invention relates to a resistance mode comparator apparatus and a method for determining a resistance, and more particularly to an apparatus and a method for determining a resistance of a magnetoresistive sensor.

BACKGROUND OF THE INVENTION

Disk drives are a cost effective data storage system for a computer or other data processing device. As shown in FIG. 1, a disk drive 10 comprises a magnetic recording medium, in the form of a disk or platter 12 having a hub 13 and a magnetic read/write transducer 14, commonly referred to as a read/write head. The read/write head 14 is attached to, or formed integrally with, a suspension arm 15 suspended over the disk 12 and affixed to a rotary actuator arm 16. A structural arm 18, fixed to a platform 20, is pivotably connected to the actuator arm 16 at a pivot joint 22. A voice coil motor 24 drives the actuator arm 16 to position the head 14 over a selected location on the disk 12.

As the disk 12 is rotated at an operating speed by a spindle motor (not shown) the moving air generated by the rotating disk, in conjunction with the physical structure of the suspension arm 15, lifts the read/write head 14 away from the platter 12, allowing the head to glide or fly on a cushion of air slightly above a surface of the disk 12. The flying height of the read/write head over the disk surface is typically less than one micron.

An arm electronics module 30 may include circuits that switch the head function between read and write operations and write drivers that supply write current to the head 14 during the write operation, for effecting a change to magnetic domains of the disk 12 to store data thereon. The arm electronics module 30 may also include a preamplifier electrically connected to the head 14 by flexible conductive leads 32. During read operations the preamplifier increases the read signal signal-to-noise ratio by amplifying the read signals produced by the head 14. In the write mode, the preamplifier scales up the relatively low voltage levels representing the data bits to be written to the disk to a voltage range of about +/−6 to +/−10V. The preamplifier also shapes the voltage levels to optimize the data writing process. The components comprising the electronics module 30 may vary according to the disk drive design, as understood by persons familiar with such technology.

To minimize signal losses and noise induced into read signals produced by the head 14 during read operations, the electronics module 30 is advantageously located proximate the head 14. A side surface of the structural arm 18 is a preferred location for mounting the electronics module 30, as shown in FIG. 1.

FIG. 2 illustrates a magnetic transducer or head 14, typically comprising a write head 14A for producing magnetic transitions in the disk 12 and a read head 14B for reading the magnetic transitions in the disk 12. During a write operation, current through the write head 14A alters magnetic domains of ferromagnetic material in a thin film 52 for storing the data bits as magnetic transitions. Data bits are stored on the platter 12 in sectors 40 on concentric tracks 42. See FIG. 1. Typically a sector contains a fixed number of bytes (for example, 256 or 512). A plurality of sectors are commonly grouped into a cluster. During read operations the read head 14B senses the magnetic transitions to determine the data bits represented by the magnetic transitions.

In other data storage systems the head 14 operates with other types of storage media (not shown in the Figures) comprising, for example, a rigid magnetic disk, a flexible magnetic disk, magnetic tape and a magneto-optical disk.

The disk drive read head 14B comprises either a magneto-resistive (MR) sensor or an inductive sensor. The former produces a higher magnitude output signal in response to the magnetic transitions, and thus the output signal exhibits a greater signal-to-noise ratio than an output signal produced by the inductive sensor. The MR sensor is thus preferred, especially when a higher areal data storage density is desired.

During read operations the read head 14B is biased by a DC (direct current) voltage of about 0.04V to 0.2V supplied by the preamplifier to read head terminals 54A and 54B via the conductive leads 32. Magnetic domains in the thin film 52 passing under the read head 14B alter a resistance of the magneto-resistive material, imposing an AC (alternating current) component on the DC bias voltage, wherein the AC component represents the read data bits. The AC component is detected in the preamplifier, but has a relatively small magnitude (e.g., several millivolts) with respect to the DC bias voltage.

According to another embodiment, the preamplifier supplies a constant current bias to the read head 14B, in lieu of the constant voltage bias described above. The bias current develops a constant voltage across the resistance of the magneto-resistive material, where the developed voltage is dependent on the value of the head resistance.

As described, the preamplifier provides not only read head signal amplification, but also supplies the fixed bias voltage (or current) for the read head 14B. As known in the art, there exist other applications in which a preamplifier amplifies a sensor signal and also supplies a sensor bias.

Drive manufacturers and system level users have an interest in measuring a read head resistance ($R_{MR}$), i.e., a resistance of the MR sensor. If the $R_{MR}$ value exceeds a critical value $R_{MR\ MAX}$ a gross failure of the head is suspected. Detection of an excessively large head resistance is commonly referred to in the industry as "open head detection." Generally, the head resistance ranges from about 5Ω-500Ω. A resistance greater than about 1 kΩ is considered problematic. An optimum head bias is also related to the head resistance, and thus knowing the head resistance permits the disk drive manufacturer to employ the optimum bias voltage.

In certain applications one or more diodes are connected across the signal terminals 54A and 54B to protect the head 14B during electrostatic discharge (ESD) events. An ESD voltage shorts the diodes thereby avoiding ESD current flow into the head 14B.

In an application where the preamplifier biases the read head 14B with a constant current $I_{MR}$, current through the terminals 54A and 54B develops a voltage $V_{MR}=I_{MR} \times R_{MR}$ across the head 14B. Since the voltage $V_{MR}$ developed by a properly functioning head is less than the diode turn-on voltage, the ESD-protection diodes remain in an off condition when the head resistance is within an expected range. A head resistance greater than a nominal value causes the constant current $I_{MR}$ to develop a voltage across the diodes that exceeds the diode turn-on voltage. A voltage mode comparator detects a head potential $V_{MR}$ in excess of a voltage threshold by determining a state of the ESD diodes. If the ESD diodes are in an on state the head resistance exceeds the nominal value.

In an embodiment in which the preamplifier delivers a constant voltage bias $V_{MR}$ to the head 14B, the voltage mode comparator technique cannot be used for open head detection since the read head voltage is fixed. Instead, a current mode comparator determines the current drawn by the head, in response to the head resistance $R_{MR}$ and the constant voltage bias $V_{MR}$, to determine the head resistance. Since the current and the voltage are known the head resistance is calculated from the equation.

$$I_{MR} = \frac{V_{MR}}{R_{MR}} \quad (1)$$

Given the inverse relationship between the head current and the head resistance (as indicated in equation (1)), a current $I_{MR\ MIN}$ detected by the current mode comparator indicates a head resistance $R_{MR\ MAX}$ ($V_{MR}$ being a known quantity). If the current mode comparator measures a head current less than $I_{MR\ MIN}$ then the head resistance exceeds $R_{MR\ MAX}$. It is known that such a head resistance measurement technique may be undesirable not only because it introduces a dependency on the predetermined bias voltage $V_{MR}$, but also because it requires the use of an undesirably small reference current $I_{MR\ MIN}$ that may compromise accuracy of the measured head resistance.

SUMMARY OF THE INVENTION

According to one embodiment, the present invention comprises an apparatus for determining a sensor resistance wherein a voltage is applied across the sensor. The apparatus comprises a circuit for generating a zero temperature coefficient current in response to a current drawn by the sensor and the voltage applied across the sensor; a first reference resistor for receiving the zero temperature coefficient current, wherein a voltage is developed across the first reference resistor in response to the zero temperature coefficient current; and a first comparator having a first terminal responsive to a predetermined voltage and a second terminal responsive to the voltage developed across the first reference resistor, for producing a signal indicative of the sensor resistance.

According to another embodiment, the invention comprises a method for determining a sensor resistance in response to a voltage applied across the sensor. The method comprises generating a zero temperature coefficient current in response to a current drawn by the sensor in response to the voltage applied across the sensor; passing the zero temperature current through a first reference resistor to develop a voltage across the first reference resistor; comparing a predetermined voltage and the voltage developed across the first reference resistor; and producing a signal indicative of the sensor resistance in response to the step of comparing.

BRIEF DESCRIPTION OF THE DRAWINGS

The present invention can be more easily understood and the advantages and uses thereof more readily apparent when the following detailed description of the present invention is read in conjunction with the figures wherein.

In accordance with common practice, the various described device features are not drawn to scale, but are drawn to emphasize specific features relevant to the invention. Reference characters denote like elements throughout the figures and text.

DETAILED DESCRIPTION OF THE INVENTION

Before describing in detail the particular method and apparatus related to open head detection according to the present invention, it should be observed that the present invention resides primarily in a novel and non-obvious combination of elements and process steps. So as not to obscure the disclosure with details that will be readily apparent to those skilled in the art, certain conventional elements and steps have been presented with lesser detail, while the drawings and the specification describe in greater detail other elements and steps pertinent to understanding the invention.

The prior art techniques described above determine the head resistance by measuring a current or a voltage functionally related to the head resistance. Since identification of a head resistance is ultimately sought, the present invention determines the head resistance using a resistance mode comparator.

The preamplifier biases the read head 14B by imposing a programmed or desired read head bias voltage $V_{MR}$ across the head resistance $R_{MR}$ resulting in a read head current $I_{MR}$. The present invention employs a resistance mode comparator responsive to the head bias voltage $V_{MR}$, the head current $I_{MR}$ and an on-chip resistor, i.e., a resistor fabricated in an integrated circuit, to determine $R_{MR}$. Use of the reference resistor permits the head resistance $R_{MR}$ to be determined indirectly.

Preferably, the resistance mode comparator comprises a comparator having a first terminal responsive to a voltage representing the head bias voltage $V_{MR}$ and a second terminal responsive to a voltage developed by passing a current representing the head current $I_{MR}$ through a reference resistor representing a nominal, properly functioning MR head resistance. Since the current drawn by the head varies inversely with the head resistance (assuming a fixed head bias voltage), the current through the reference resistor varies inversely with the head resistance and thus the voltage at the second input terminal varies inversely with the head resistance. An output state of the comparator, as presented at a comparator output terminal, is determined by a difference of the two input voltages, where the output state assumes one of two values indicating whether the head resistance is above or below a predetermined head resistance threshold.

Figure 3:
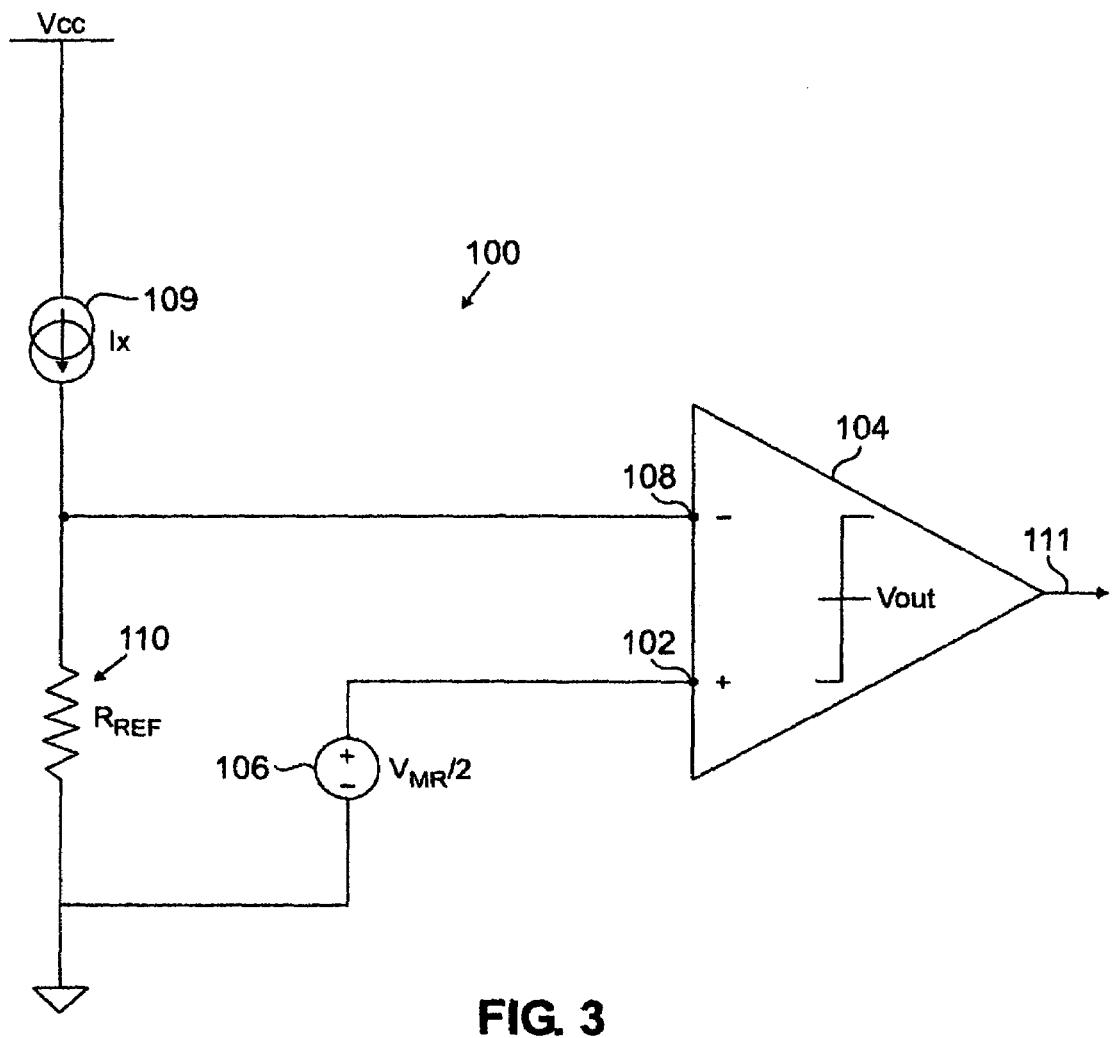
FIG. 3 is a schematic diagram of a resistance mode comparator according to one embodiment of the present invention.

One embodiment of a resistance mode comparator 100 according to the present invention is illustrated in FIG. 3. A potential at a non-inverting input terminal 102 of a comparator 104 (in one embodiment the comparator 104 comprises a high-gain comparator) is supplied by a voltage source 106, which in a preferred embodiment is one-half the programmed head bias voltage, i.e., $V_{MR}/2$. The potential at an inverting input terminal 108 is determined by a product of a current $I_X$ supplied by a current source 109 and a resistance of a reference resistor $R_{REF}$ 110. A value of the reference resistor 110 is selected to represent a typical or nominal read head resistance. The current $I_X$ is responsive to the current $I_{MR}$ drawn by the read head 14B. For example, in one embodiment the current source 109 that supplies the current $I_X$ comprises a current mirror controlled by the head current $I_{MR}$. Thus the current $I_X$ may be fractionally or multiplicatively related to the head current $I_{MR}$.

In response to an increase in the head resistance $R_{MR}$, the head current $I_{MR}$ decreases to maintain the constant programmed bias voltage across the head 14B. The current $I_X$ decreases responsive to the decrease in the current $I_{MR}$, lowering the voltage at the inverting input terminal 108. When the inverting input terminal voltage falls below $V_{MR}/2$, the comparator output 111 switches to a high logic state, indicating that the head resistance exceeds a predetermined value. In another embodiment, connections to the inverting and non-inverting input terminals 108 and 102 are reversed and the comparator 104 switches to a low logic state to indicate a head resistance greater than a predetermined value.

To generate the programmed read head bias voltage, the preamplifier may generate a scaled reference bias voltage fractionally related to the programmed head bias voltage. The scaled reference voltage is scaled up to produce the programmed head bias voltage that is applied to the head 14B. According to the present invention, any one of the programmed head bias voltage, the scaled reference voltage or a scaled value of the programmed head bias voltage can be used to establish the voltage at the inverting input terminal, with corresponding scale modifications to the current $I_X$ and the reference resistor 110 such that the comparator output state indicates the head resistance.

The voltage $V_{MR}/2$ referred to in FIG. 3 as applied to the non-inverting input terminal of the comparator 104 is merely exemplary. Other voltages can be used depending on a relationship between the value of the reference resistor 110 and the nominal head resistance and/or the relationship between the current $I_X$ and the head current $I_{MR}$.

According to one embodiment of the present invention, the current $I_X$ is related to the head current $I_{MR}$ drawn by the head resistance $R_{MR}$ by a scaling factor "F." The current $I_X$ supplied by the current source 109 is therefore:

$$I_X = FI_{MR} = \frac{FV_{MR}}{R_{MR}} \quad (2)$$

A critical value of $R_{MR}$ at which the comparator output 111 switches to a high logic level to indicate a head resistance greater than a predetermined permitted maximum resistance is referred to as $R_{MR\ MAX}$. For an embodiment where the exemplary voltage reference $V_{MR}/2$ is applied to the non-inverting terminal 102 and combining equations (1) and (2):

$$\frac{V_{MR}}{2} = I_X R_{REF} = FV_{MR} \frac{R_{REF}}{R_{MR}^{Max}} \quad (3)$$

therefore:

$$R_{MR}^{Max} = 2FR_{REF} \quad (4)$$

Use of the scaling factor F is not required according to the present invention, but may be a pragmatic option to reduce current magnitudes through the operative components of the resistance mode comparator.

According to a preferred embodiment, the resistance mode comparator of the present invention (such as the resistance mode comparator 100) is disposed within an integrated circuit, and the reference resistor 110 comprises an on-chip resistor. Ideally, the on-chip resistor exhibits the same temperature coefficient characteristics as the head resistance that it represents, and as the head resistance changes in response to temperature changes during operation, the resistance of the reference resistor 110 changes by a like amount. Thus the head resistance is accurately determined by the resistance mode comparator 100 despite operational temperature variations. However, it is not considered feasible to fabricate an on-chip resistor (the reference resistor 110) that mimics the temperature coefficient characteristics of an off-chip resistor (the read head resistance). The resistance mode comparator 100 therefore may not provide sufficiently accurate results due to these different temperature coefficient characteristics.

Additionally, fabrication process anomalies hinder the fabrication of a stable and repeatable reference resistance 110, thus affecting the accuracy of the head resistance determined by the resistance mode comparator 100 using the reference resistor 110.

In one embodiment, using an exemplary scaling factor of F=1/20 and an on-chip reference resistor 110 ($R_{REF}$) with a nominal value of 34 kΩ, the detection threshold (i.e., detection of a head resistance greater than the maximum permitted resistance $R_{MR\ MAX}$) varies over expected process and temperature variations that affect the value of the reference resistor 110 ($R_{REF}$). For a reference resistor 110 comprising a typical integrated circuit silicon resistor, Table 1 summarizes the detection threshold variations (as expressed relative to the reference resistance maximum value $R_{MR\ MAX}$) due to fabrication process variations and high and low operating temperature extremes, and further assuming that the reference resistor 110 is fabricated from either high or low sheet resistance materials. The combined effect of these variations results in $R_{MR\ MAX}$ ranging from a minimum value of 2442Ω to a maximum value of 4837Ω.

TABLE 1

Resistance Mode Comparator Threshold Variation

| Case | $R_{MR\ MAX}$ | % Detection Variation of $R_{MR\ MAX}$ From Nominal |
|---|---|---|
| Nominal | 3445 Ω | 0.00% |
| Minimum | 2442 Ω | −29.1% |
| Maximum | 4837 Ω | +40.4% |

Table 1 highlights a disadvantage of the FIG. 3 embodiment. When determining the head resistance $R_{MR}$, the comparator threshold detection is dependent on the value of the reference resistor 110, which may vary significantly (e.g., from 2442Ω to 4837Ω) over normal processing tolerances, sheet resistance material variations and operating temperatures. As can be seen, variations in the reference resistor value cause significant variations in the accuracy of the head resistance determination, e.g., as much as −29.1% to +40.4%.

Figure 6:
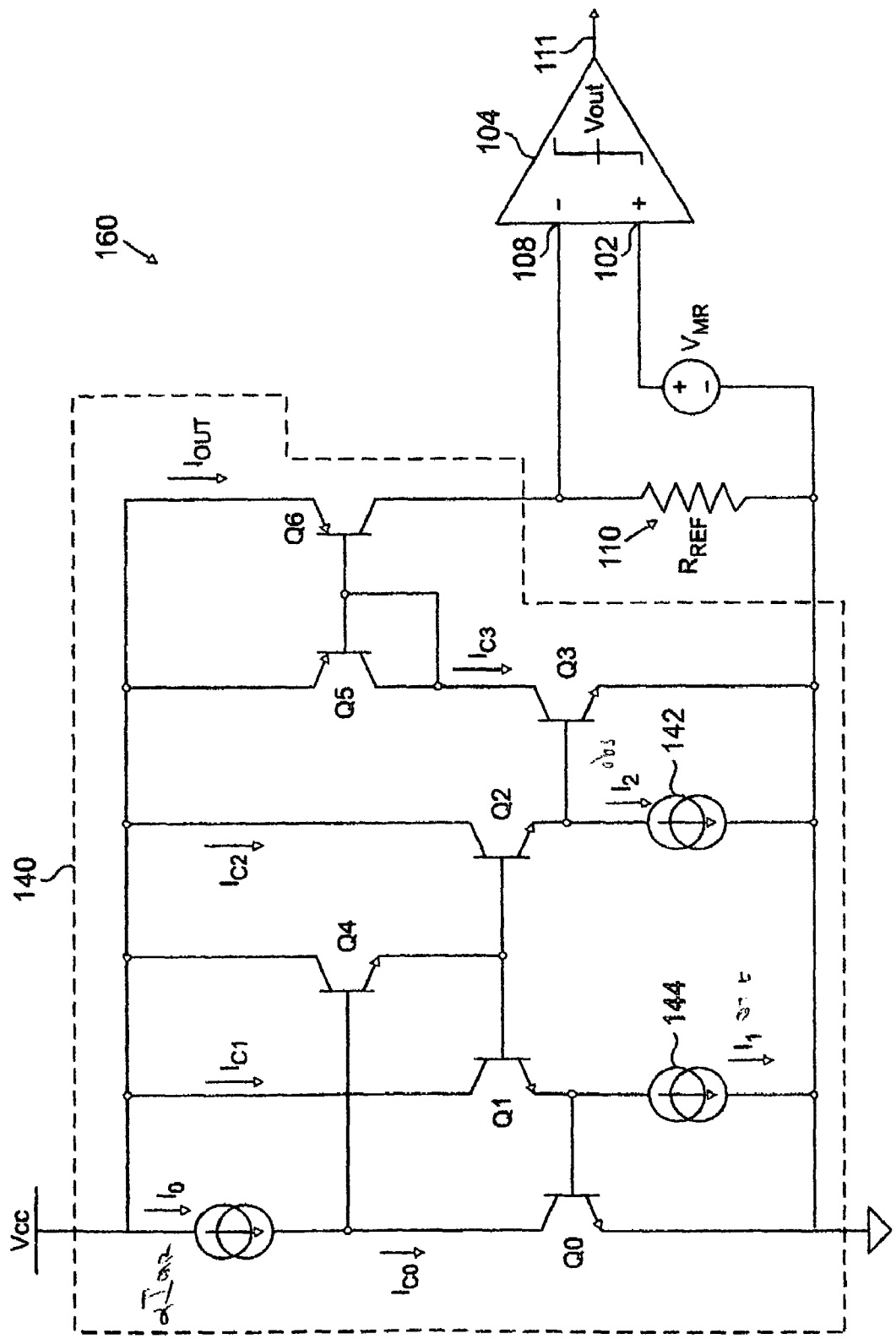
FIG. 6 is a schematic diagram of a resistance mode comparator including the current multiplier of FIG. 5.

To overcome these disadvantages, another embodiment of a resistance mode comparator 160 of the present invention, illustrated in FIG. 6, utilizes a zero temperature coefficient current (0TC current) that is generated in response to the current through the head (or according to another embodiment, in response to a current related to the current through the head). As is known, a 0TC current flowing through an appropriate resistor develops a voltage that is independent of variations in the resistor temperature. Thus the 0TC current varies with temperature, but the voltage drop across the resistor due to the 0TC current is invariant with temperature.

The resistance mode comparator 160 is responsive to a 0TC current generated by a 0TC current generator (such as the prior art 0TC current generator 130 of FIG. 4) and is further responsive to the head current or a scaled head current. The resistance mode comparator 160 further comprises a current multiplier (such as the current multiplier 140 of FIG. 5) that converts the head current or the scaled head current to a 0TC current. The resistance mode comparator 160 passes the 0TC-converted head current through the reference resistor 110 to determine the head resistance. Thus the 0TC-converted head current supplied to the resistance mode comparator 160 mimics the head current, but without the effects of temperature and fabrication induced variations. Use of the 0TC-converted head current in the resistance mode comparator 160 of the present invention improves the head resistance measurement by removing the dependency of the determined head resistance $R_{MR}$ on the temperature and fabrication variations that affect the resistance of the reference resistor 110. The resistance mode comparator threshold is rendered substantially insensitive to variations in the value of the reference resistor 110 and the head resistance is more accurately determined.

Figure 4:
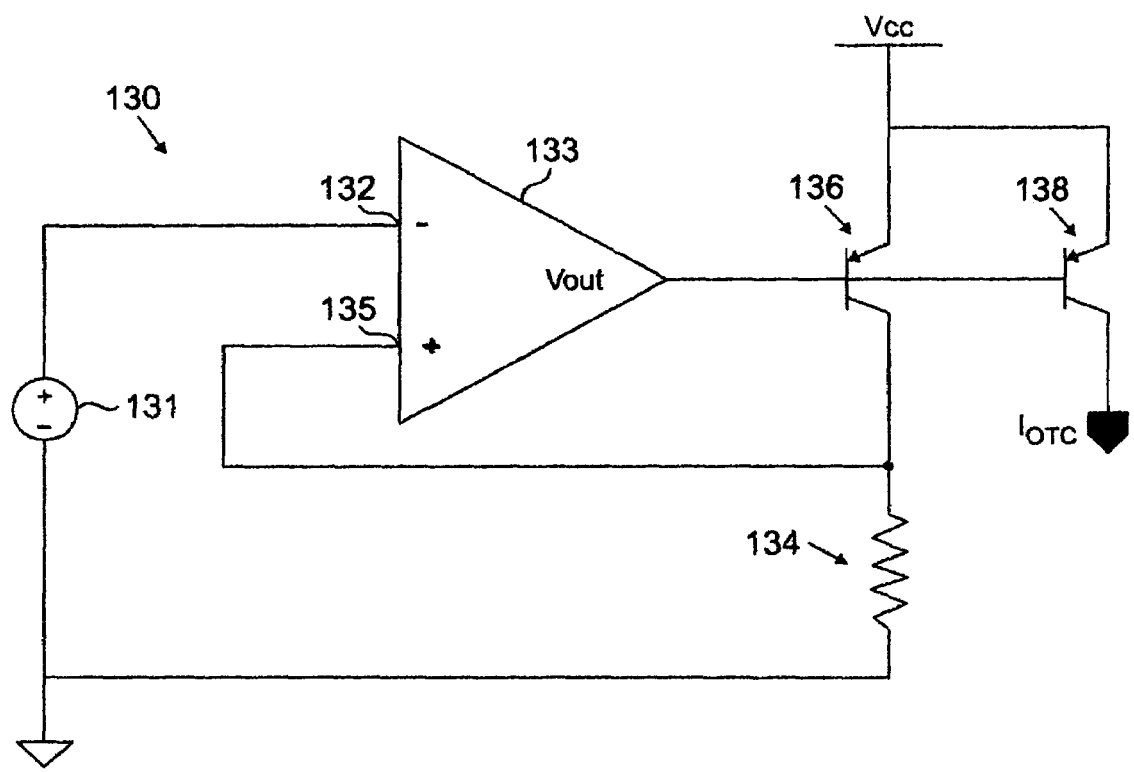
FIG. 4 is a schematic diagram of a zero temperature coefficient current generator.

FIG. 4 depicts an exemplary prior art 0TC current generator 130 that illustrates one technique for generating a 0TC current for use with the resistance mode comparator 160. The 0TC current generator 130 comprises a DC reference voltage 131 (for example, a band gap reference voltage) connected between ground and a non-inverting input terminal 132 of a comparator 133. A reference resistor 134 is connected between an inverting input terminal 135 and ground, and supplied with current from a voltage source $V_{CC}$ through a transistor 136. As a voltage drop across the resistor 134 increases/decreases, for example, as a result of operating temperature variations that change it's resistance, the comparator output changes in accordance with the difference between the resistor voltage drop and the DC reference voltage 131.

When the voltage drop across the resistor 134 is less than the DC reference voltage 131, the comparator switches "on" to supply additional current from the source $V_{CC}$ through the transistor 136 to the resistor 134. The additional current increases the voltage drop across the resistor 134 until the voltage drop and the reference voltage are substantially equal. At which point the comparator switches "off" and the voltage drop across the resistor 134 stabilizes.

Conversely, if the resistor voltage drop is greater than the DC reference voltage 131, the comparator switches "off" to reduce resistor current flow and lower the resistor voltage drop. In this way, the current through the resistor is modulated to maintain a voltage drop equal to the reference voltage. The current through the resistor is thus referred to as a 0TC current.

As further illustrated in FIG. 4, the 0TC current through the transistor 136 is mirrored to a transistor 138. Thus the output current $I_{OTC}$ through the transistor 138 exhibits the properties of a 0TC current.

Figure 5:
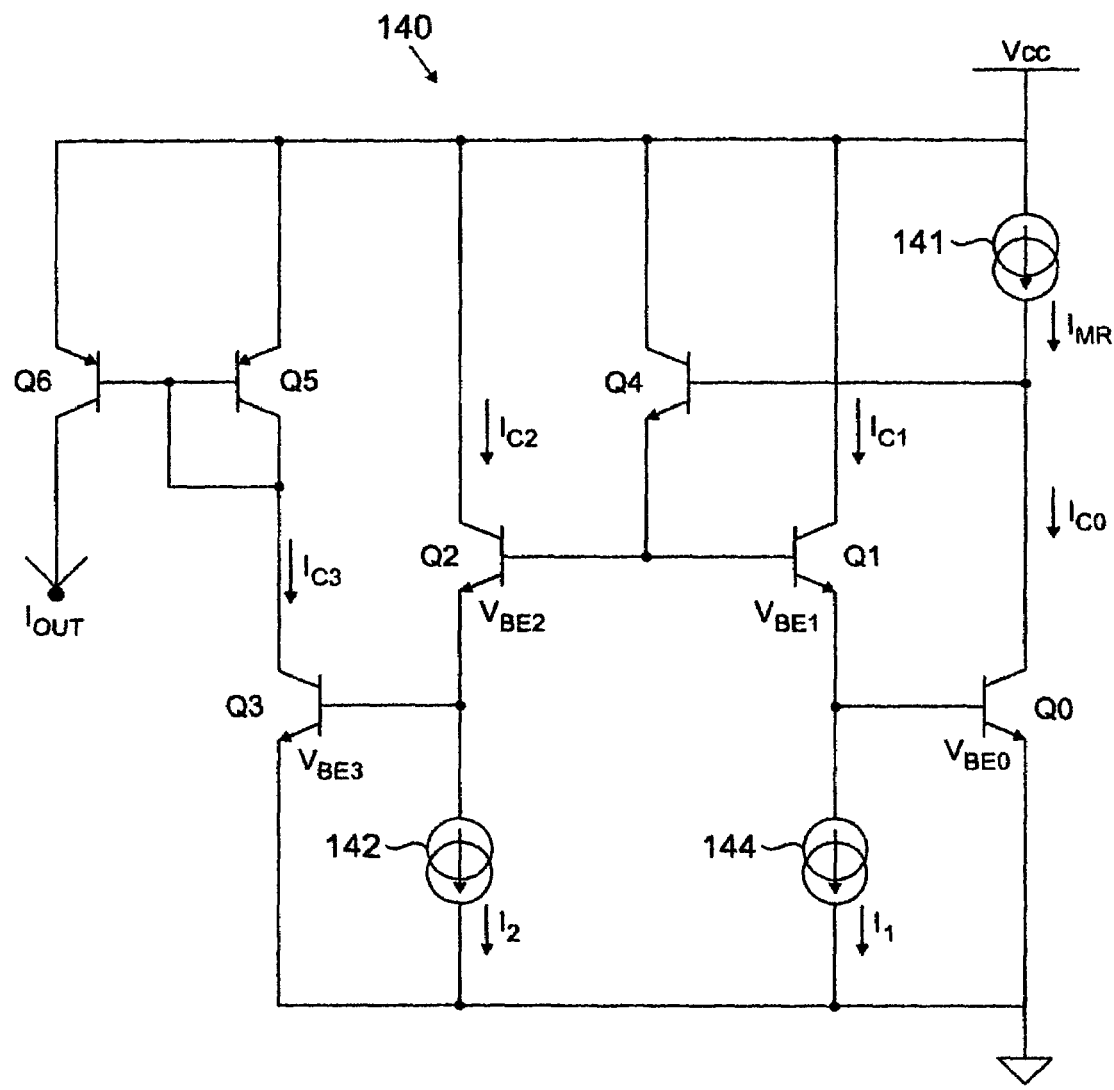
FIG. 5 is a schematic diagram of a current multiplier of the present invention.

FIG. 5 illustrates a current multiplier 140 for converting the head current $I_{MR}$, i.e., the current drawn by the read head 14B (or a scaled value thereof $FI_{MR}$) to a 0TC output current designated $I_{OUT}$. The head current $I_{MR}$ (or a scaled version thereof $FI_{MR}$) is supplied to the current multiplier 140 by a current source 141. Typically, the current source 141 is a current mirror controlled by a current mirror master (not shown) responsive to the head current or the scaled head current.

The current multiplier is further responsive to an absolute current $I_2$, i.e., a current that is trimmed over process variations and does not vary with temperature, supplied by a current source 144. The absolute current is programmable to substantially overcome fabrication variations that cause the current to vary from a predetermined value. This is accomplished by employing fusibly-linked trimming components operative in conjunction with the current source 144. Certain of the links are opened and others remain in a closed state to insert or remove trimming components such that the current source 144 produces the specified absolute current value, e.g., 25 µA in one embodiment.

The absolute current $I_2$ is also invariant over temperature. According to one embodiment, this is accomplished by producing $I_2$ from a proper ratio of two currents (referred to as a PTAT current and a CTAT current) that have opposite temperature coefficients. That is, the PTAT current increase as the temperature increases, whereas the CTAT current decreases as the temperature increases. Thus, the current source 142 represents components operative therewith for producing the absolute current $I_2$, i.e., the current source 142 comprises a substantially ideal current source.

A current $I_1$ supplied by a current source 144 is a 0TC current, such as the 0TC current produced by the 0TC current generator 130 of FIG. 4.

Using Kirchoff's voltage law, a base-emitter potential of a transistor Q3 can be written as:

$$V_{BE3} = V_{BE0} + V_{BE1} - V_{BE2} \quad (5)$$

Neglecting the effects of transistor base currents in the current multiplier 140 and using the well-known collector current/base-emitter potential relationship, $I_{C3}$ of transistor Q3 can be expressed as:

$$I_{C3} = I_{C1} \exp((V_{BE\,3} - V_{BE\,1})/V_T) \quad (6)$$

Note that the output current $I_{OUT}$ is mirrored from $I_{C3}$. Thus the current $I_{C3}$ determines the output current of the current multiplier 140.

The difference in base-emitter potentials of transistors Q0 and Q2 is:

$$V_{BE0} - V_{BE2} = V_T \ln\left(\frac{I_{C0}}{I_{C2}}\right) \quad (7)$$

The relationships given in equations (5) and (7) can be incorporated into (6) to describe the collector current of Q3 (i.e., the current $I_{C3}$) as a function of the three input currents supplied to the current multiplier 140: the head current $I_{MR}$, the 0TC current $I_1$ and the absolute current $I_2$. Specifically, this relationship is:

$$I_{C3} = I_{C1} \frac{I_{C0}}{I_{C2}} \quad (8)$$

$$I_{OUT} = I_1 \frac{FI_{MR}}{I_2} \quad (9)$$

Where (9) is derived from (8) by neglecting transistor base currents and recognizing that $FI_{MR} = I_{C0}$, $I_1 = I_{C1}$ (the 0TC current), $I_2 = I_{C2}$ (the absolute current) and $I_{OUT}$ is mirrored from $I_{C3}$ via a current mirror comprising transistors Q5 and Q6. The 0TC current $I_1 = I_{C1}$ sets the temperature coefficient for $I_{OUT}$, i.e., the 0TC current produces a voltage drop across a proper resistor that is invariant with temperature. The ratio of $FI_{MR}/I_2$, representing division of the scaled head current by an absolute current, yields a scalar value that is multiplied by the 0TC current $I_1=I_{C1}$. In another embodiment, the head current is not scaled and therefore $I_{C0}=I_{MR}$ FIG. 6 illustrates a resistance mode comparator 160 comprising the current multiplier 140 of FIG. 5. An output from the current multiplier 140 comprises a 0TC current $I_{OUT}$ (the collector current of the transistor Q6). Those skilled in the art recognize that other current multipliers can be used in place of the current multiplier 140 to generate a zero temperature coefficient current in response to the scaled head current $FI_{MR}$ or the head current $I_{MR}$.

As shown in FIG. 6, the current $I_{OUT}$ drives the reference resistor 110, generating a voltage $I_{OUT} \times R_{REF}$ that is supplied to the inverting input terminal 108 of the comparator 104. The voltage across the reference resistor 110 is, by definition, constant over the processing tolerances and operating temperature of the resistor 110, since the current $I_{OUT}$ is derived from an absolute current (current $I_2$ supplied by the current source 142) and a 0TC current, (current $I_1$ supplied by the current source 144) and provided the reference resistor 110 is substantially identical to the resistor used to generate the 0TC current. For example, if the 0TC current generator 130 of FIG. 4 generates the 0TC current, then the resistor 110 should be substantially identical to the resistor 134, i.e., the resistors 110 and 134 are fabricated according to the same fabrication processes, using the same materials and having substantially the same temperature coefficient and geometry. Thus $I_{OUT}*R_{REF}$ is an absolute voltage created by passing the 0TC current through the reference resistor 110, regardless of any process or temperature induced variations in the resistance value of the reference resistor 110.

When using the resistance mode comparator 160 to determine the head resistance $R_{MR}$, the head resistance can be considered an ideal resistor (i.e., not subject to resistance variations due to temperature changes). Thus the resistance mode comparator directly determines whether the head resistance is above or below a predetermined threshold without the need to compensate the determined head resistance for temperature or fabrication effects. That is, when the bias voltage $V_{MR}$ is applied across the head resistance $R_{MR}$ by the preamplifier, it is desired to determine the absolute value of the current $I_{MR}$ (or a scaled value of the head current) that flows therethrough. Therefore, if the scaled version of the head current (or the head current without scaling in another embodiment) is divided by the absolute current $I_2$, the result is a scalar and the head current retains its absolute character, as indicated by:

$$\frac{FI_{MR}}{I_2} = \frac{FV_{MR}}{R_{MR}I_2}. \tag{10}$$

The threshold of the comparator 104 can then be found by setting the inverting and non-inverting input terminals 108 and 102 equal to one another, such that $$V_{MR}=I_{OUT}*R_{REF} \tag{11}$$

From equations (9) and (10):

$$V_{MR} = I_1 R_{REF} * \frac{FV_{MR}}{R_{MR}I_2} \tag{12}$$

From which it can be seen that:

$$R_{MR}^{Max} = \frac{FI_1 R_{REF}}{I_2} \tag{13}$$

where again $I_1$ is the 0TC current and $I_2$ is the absolute current. Because the product $I_1*R_{REF}$ is always a constant (1V in a preferred embodiment) and F is a constant (1/20 in one embodiment), then it is desired that $I_2$ be a constant value over all process and temperature variations. Since $I_2$ is an absolute current, it possess these characteristics.

Assuming, in one embodiment, that the product $I_1R_{REF}=1V$, $I_2=25uA$ and $F=1/20$, the threshold of the comparator 104 is approximately 2 kΩ. That is, the output terminal 111 of the comparator 104 has a logic high output for a head resistance $R_{MR}$ greater than about 2KΩ and a logic low output for a head resistance less than about 2KΩ. The output logic level of the comparator 104 can be supplied as an input to a fault reporting register, such that the register stores a value indicating a head resistance exceeding an expected or nominal value.

A summary of simulation results of the threshold variation over expected process and system tolerances, using the resistance mode comparator 160 is given below in Table 2.

TABLE 2

Improved Resistance Mode Comparator Threshold Variation

| Case | $R_{MR\,MAX}$ | % Variation of Detection of $R_{MR\,MAX}$ From Nominal |
|---|---|---|
| Nominal | 2059 Ω | 0.00% |
| Minimum | 2050 Ω | −0.44% |
| Maximum | 2083 Ω | +1.17% |

Comparing the threshold variation shown in Table 2 with those of Table 1 illustrates that the conversion of the head current of the scaled head current to a 0TC current substantially reduces the dependency of the comparator threshold on a specific value for the reference resistor 110.

It is noted that any circuit that can generate the current functional relationship set forth in equation (8) can be used in the resistance mode comparator 160 in place of the current multiplier 140. For example, this current relationship can be implemented by a circuit employing MOSFETS (metal oxide semiconductor field effect transistors) in lieu of the illustrated bipolar junction field effect transistors.

Figure 1:
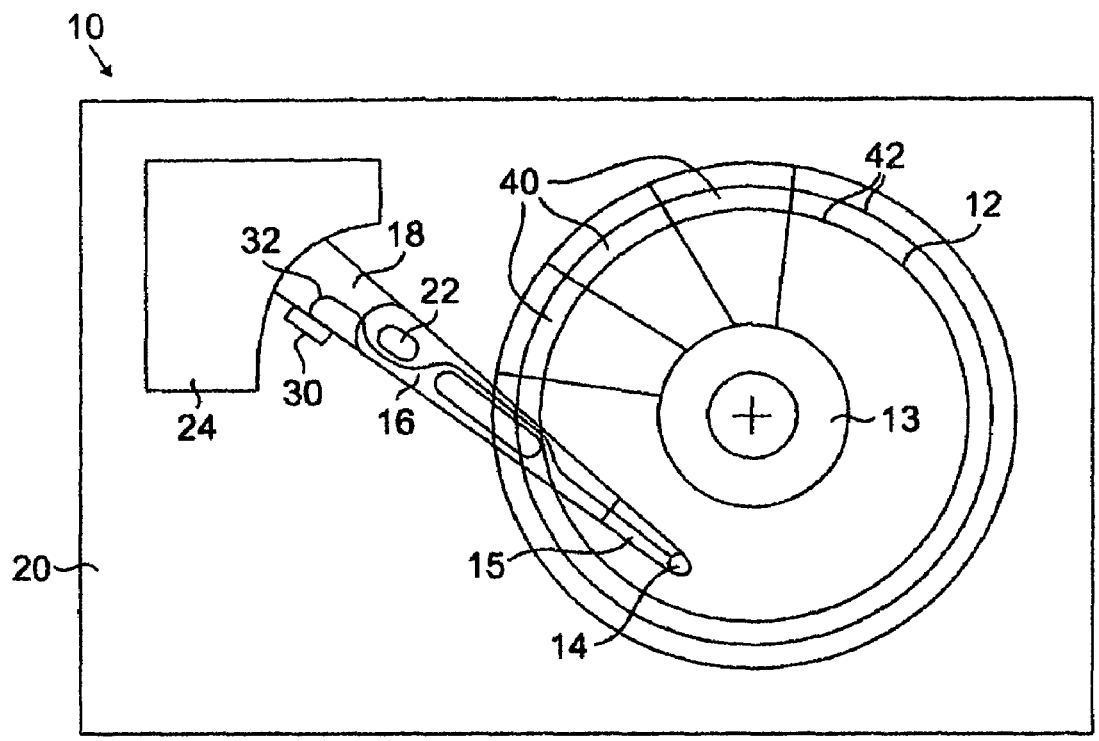
FIG. 1 illustrates a prior art disk drive to which the teachings of the present invention can be applied.
Figure 2:
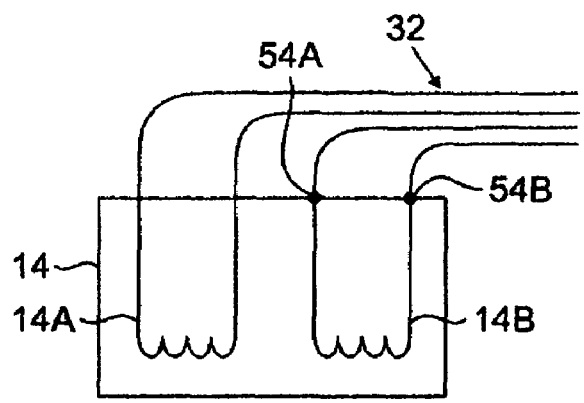
FIG. 2 is a schematic diagram of a prior art head of the disk drive of FIG. 1.
Figure 2:
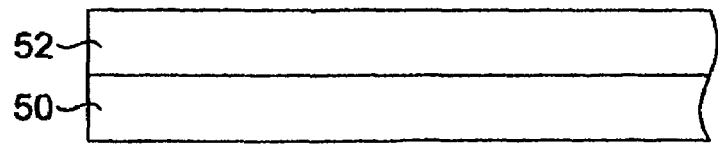

One advantage according to the teachings of the present inventive apparatus and method for detecting the resistance of the read head 14B is the accuracy of the resistance determination for an unusually large head resistance, where the measurement is insensitive to the specific value of the on-chip reference resistor when a constant voltage head bias is supplied by the preamplifier of FIG. 1. The results set forth in Tables 1 and 2 illustrate the advantages to be gained by use of the present invention in the determination of head resistance. The teachings of the present invention can also be applied to measuring the resistance of other sensor types, such as sensors commonly used for sensing magnetic polarizations, temperature, etc. The teachings can also be applied to determining the resistance of any inductive element, such as a solenoid.

Although in a preferred embodiment of the present invention the resistance of a disk drive storage system head is determined by the resistance mode comparator disposed in the preamplifier, such a location is not necessarily required for determining the head resistance according to the present invention.

While the present invention has been described with reference to preferred embodiments, it will be understood by those skilled in the art that various changes may be made and equivalent elements may be substituted for the elements thereof without departing from the scope of the invention. The scope of the present invention further includes any combination of elements from the various embodiments set forth herein. In addition, modifications may be made to adapt a particular situation to the teachings of the present invention without departing from its essential scope. Therefore, it is intended that the invention not be limited to the particular embodiments disclosed, but that the invention will include all embodiments falling within the scope of the appended claims.

What is claimed is:

1. An apparatus for determining a sensor resistance wherein a voltage is applied across the sensor, comprising:
    a circuit producing a zero temperature coefficient current in response to a current drawn by the sensor or in response to a current related to the current drawn by the sensor;
    a first reference resistor receiving the zero temperature coefficient current, a voltage developing across the first reference resistor in response to the zero temperature coefficient current wherein the voltage developed across the first reference resistor comprises an absolute voltage; and
    a comparator having a first terminal responsive to a predetermined voltage and a second terminal responsive to the voltage developed across the first reference resistor, the comparator producing a signal indicative of the sensor resistance when a difference between the predetermined voltage and the voltage developed across the first reference resistor exceeds a detection threshold of the comparator, wherein the detection threshold of the comparator is determined by the first reference resistor, the zero temperature coefficient current and an absolute current, such that the detection threshold of the comparator is substantially independent of process and temperature variations.

2. The apparatus of claim 1 wherein the sensor comprises an inductive element.

3. The apparatus of claim 1 wherein the sensor comprises a magneto-resistive sensor, and wherein the signal indicates that a resistance of the magneto-resistive sensor exceeds a predetermined resistance value.

4. The apparatus of claim 3 wherein the magneto-resistive sensor operates in conjunction with a disk drive system to determine magnetic transitions representing stored data in a magnetic material of the disk drive system.

5. The apparatus of claim 1 wherein the current related to the current drawn by the sensor comprises a current that is fractionally related to the current drawn by the sensor.

6. The apparatus of claim 1 wherein the voltage developed across the first reference resistor is substantially independent of variations in resistance of the first reference resistor.

7. The apparatus of claim 1 wherein the signal indicative of the sensor resistance comprises a binary signal having a first state in response to a sensor resistance greater than a predetermined resistance and a second state in response to a sensor resistance less than the predetermined resistance.

8. The apparatus of claim 1 wherein the circuit producing the zero temperature coefficient current comprises a current multiplier responsive to an input zero temperature coefficient current, and absolute current and a current drawn by the sensor or a current related to the current drawn by the sensor, wherein the circuit produces an output zero temperature coefficient current that is functionally related to the input zero temperature coefficient current, to the absolute current and to either the current drawn by the sensor or the current related to the current drawn by the sensor.

9. The apparatus of claim 1 wherein a detection threshold of the comparator is determined by the first reference resistor, a predetermined scale factor, the zero temperature coefficient current and an absolute current.

10. The apparatus of claim 9 wherein the detection threshold is adjustable in response to a change in a value of at least one of the first reference resistor and the scale factor.

11. The apparatus of claim 1 wherein a detection threshold of the comparator comprises a mathematical product of a scale factor, the zero temperature coefficient current and a resistance of the first reference resistor, and wherein the mathematical product is divided by an absolute current.

12. An apparatus for determining a sensor resistance wherein a voltage is applied across the sensor, comprising:
    a circuit producing a zero temperature coefficient current in response to a current drawn by the sensor or in response to a current related to the current drawn by the sensor;
    a first reference resistor receiving the zero temperature coefficient current, a voltage developing across the first reference resistor in response to the zero temperature coefficient current; and
    a comparator having a first terminal responsive to a predetermined voltage and a second terminal responsive to the voltage developed across the first reference resistor, the comparator producing a signal indicative of the sensor resistance when a difference between the predetermined voltage and the voltage developed across the first reference resistor exceeds a detection threshold of the comparator,
    wherein the circuit producing the zero temperature coefficient current comprises a current multiplier, wherein the zero temperature coefficient current produced by the current multiplier is determined by a product of an input zero temperature coefficient current and a ratio, and wherein the ratio has a numerator comprising the current drawn by the sensor or the current related to the current drawn by the sensor and a denominator comprising an absolute current.

13. The apparatus of claim 12 wherein the absolute current is invariant over process variations and temperature changes.

14. The apparatus of claim 12 wherein the first reference resistor is substantially identical to a second resistor that generators the input zero temperature current with respect to process and temperature variations that affect a resistance of the first reference resistor and a resistance of the second resistor.

15. An apparatus for determining if a resistance of a magneto-resistive sensor exceeds a predetermined resistance, where a voltage is applied across the sensor, the apparatus comprising:
    a circuit comprising a current multiplier producing a current in response to a sensor current drawn by the sensor or in response to a secondary current related to the current drawn by the sensor;
    a reference resistor receiving the current that develops a voltage across the reference resistor, wherein the voltage is substantially insensitive to temperature and fabrication variations that affect a resistance of the reference resistor, and wherein the resistance of the reference resistor is related to a nominal resistance of the sensor;

a comparator having a first terminal responsive to a predetermined voltage and a second terminal responsive to the voltage developed across the reference resistor, wherein the comparator produces a signal indicative of whether the resistance of the magneto-resistive sensor exceeds a predetermined resistance when a difference between the predetermined voltage and the voltage developed across the first reference resistor exceeds a detection threshold of the comparator; and a current multiplier responsive to an absolute current and a current drawn by the sensor or a current related to the current drawn by the sensor, wherein the current that develops the voltage across the reference resistor comprises an output zero temperature coefficient current produced by the current multiplier.

16. The apparatus of claim 15 wherein the predetermined voltage is substantially equal to or fractionally related to the voltage applied across the sensor.

17. The apparatus of claim 15 wherein the signal indicates that the resistance of the magneto-resistive sensor exceeds a predetermined resistance.

18. The apparatus of claim 15 wherein the current received by the reference resistor comprises a zero temperature coefficient current that is derived from a current drawn by the sensor.

19. A disk drive for writing data to and reading data from a storage medium, the disk drive comprising:
   a magneto-resistive sensor having a bias voltage applied thereacross, wherein the sensor reads the data by sensing magnetic variations in the storage medium, wherein the sensor exhibits a sensor resistance;
   a circuit comprising a current multiplier producing a current in response to a sensor current drawn by the sensor or in response to a secondary current related to the current drawn by the sensor;
   a reference resistor receiving the current that develops a voltage across the reference resistor, wherein the voltage is substantially insensitive to temperature and fabrications variations that affect a resistance of the reference resistor, and wherein the resistance of the reference resistor is related to the sensor resistance;
   a comparator having a first terminal responsive to a predetermined voltage and a second terminal responsive to the voltage, wherein the comparator produces a signal indicative of the sensor resistance when a difference between the predetermined voltage and the voltage developed across the first reference resistor exceeds a detection threshold of the comparator; and
   a current multiplier responsive to an absolute current and a current drawn by the sensor or a current related to the current drawn by the sensor, wherein the current that develops the voltage across the reference resistor comprises an output zero temperature coefficient current produced by the current multiplier.

20. The disk drive of claim 19 wherein the signal indicative of the sensor resistance comprises a signal indicating that the sensor resistance exceeds a predetermined maximum value.

21. The disk drive of claim 19 wherein the reference resistor is disposed on an integrated circuit and the magneto-resistive sensor is not disposed on the integrated circuit.

22. The apparatus of claim 19 wherein the current received by the reference resistor comprises a zero temperature coefficient current that is derived from a current drawn by the sensor.

23. A method for determining a sensor resistance in response to a voltage applied across the sensor, comprising:
   generating a zero temperature coefficient current responsive to a current drawn by the sensor in response to the voltage applied across the sensor, wherein the step of generating the zero temperature coefficient current comprises generating the zero temperature coefficient current using a resistor that is substantially identical, with respect to process and temperature variations, to a reference resistor;
   causing the zero temperature coefficient current to flow through the reference resistor to develop a voltage across the reference resistor;
   comparing in a comparator a predetermined voltage and the voltage developed across the reference resistor, wherein a detection threshold of the comparator is determined by the reference resistor, the zero temperature coefficient current and an absolute current; and
   producing a signal indicative of the sensor resistance in response to the step of comparing when a difference between the predetermined voltage and the voltage developed across the first reference resistor exceeds the detection threshold of the comparator.

24. The method of claim 23 wherein the sensor is selected from an inductive element and a magneto-resistive element.

* * * * *